G. SYKES.
TILLING TOOL.
APPLICATION FILED MAR. 6, 1920.
1,384,220.
Patented July 12, 1921.
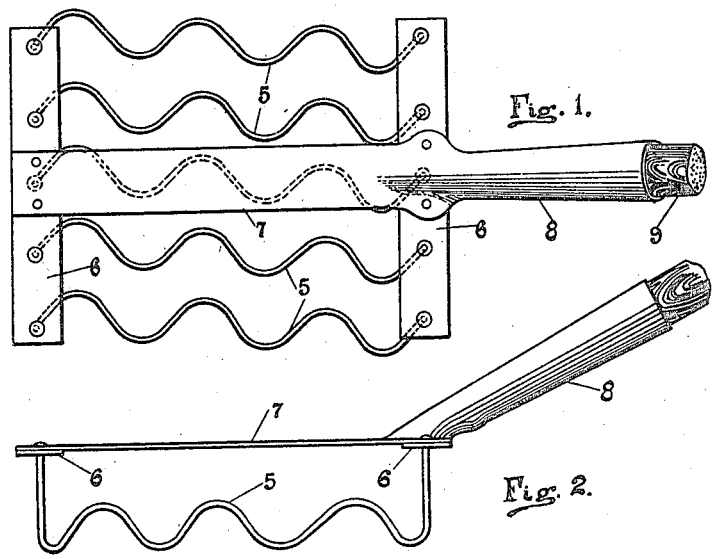
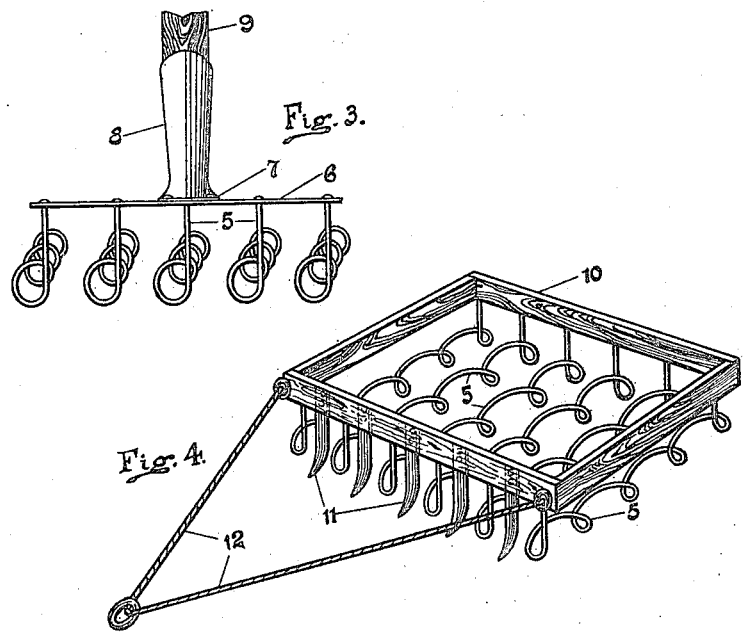
INVENTOR:
GEORGE SYKES.
PER: George E Folkes
ATTORNEY.

UNITED STATES PATENT OFFICE.

GEORGE SYKES, OF WARWICK, ENGLAND, ASSIGNOR TO EAGLE ENGINEERING COMPANY, LIMITED, OF WARWICK, ENGLAND.

TILLING-TOOL.

1,384,220.   Specification of Letters Patent.   Patented July 12, 1921.

Application filed March 6, 1920. Serial No. 363,824.

*To all whom it may concern:*

Be it known that I, GEORGE SYKES, a subject of the King of Great Britain, residing at Cemetery Lodge, Birmingham Road, Warwick, England, have invented a new and useful Improved Tilling-Tool; and I hereby declare the following to be a full, clear, and exact description of the same.

This invention has reference to a new or improved tilling tool for performing tillage operations on the surface of the soil similar to those at present performed by such agricultural implements as rakes, scarifiers, harrows, scuffles, or cultivators. The invention may be applied to a hand or a power operated tool according to the requirements and the capacity of the tool.

The object of the invention is to produce a new or improved tool of the said character which is of simplified construction and can be more cheaply produced than existing tools of this character and which will operate with equal or greater efficiency.

The invention consists of a tillage tool in which the tilling members are spirally formed and mounted upon a frame, said frame being adapted for connection to any desired operating member such as a handle, drag chains, or other coupling. The said spirally formed members may be employed in combination with tines or similar agricultural tools.

This invention will now be described with reference to the accompanying sheet of drawings in which:—

Figure 1 is a plan of a tilling tool adapted for manual operation.

Fig. 2 is a side elevation of the tool, and to avoid confusion illustrates the first or nearest coil only.

Fig. 3 is an end view of Fig. 1, and

Fig. 4 is a perspective view of a modified construction of the tool adapted for use with a horse or tractor, the tool being arranged in conjunction with a series of tines.

Referring first to Figs. 1 to 3, a plurality of spirally wound or formed members such as wires 5 are disposed adjacent to one another at any required setting, the free ends of the wires being secured to the end members 6 of a frame to which members is riveted a plate 7 formed integral with a socket 8 which completes the frame, said socket being adapted to receive the operating handle 9 whereby motion is imparted to the tool. The said spirally formed members 5 are adapted to enter the surface of the soil, generally after the initial breaking thereof, to refine the soil, the spirally wound members successively passing across and through the soil in the direction of their length. By this means a spiral motion may be said to be imparted to the soil somewhat in the manner of a plow share.

Referring now more particularly to Fig. 4 which illustrates a tool for heavier work the spirally wound members 5 are mounted upon a rectangular frame 10 the front bar of which frame has tines 11 secured thereto relative to the spirally wound members 5 so as to initially break the soil before the coils enter it. Connected to the frame is a flexible cable 12 by means of which the tool can be attached to the harness of a horse or to a tractor.

A large number of modifications may be made in the construction and arrangement of the coiled or spirally formed members 5 and no limitation is herein imposed in this respect, for instance, the said spirally formed members 5 may be arranged to intersect one another, instead of the substantially parallel alinement shown in the drawings; or the coiled tilling members may be disposed diagonally to the direction of motion. Moreover, the actual section of the said members comprising the tool is capable of considerable variation, for example, instead of wires of circular section, the wires might be of rectangular, triangular, or other section.

What I claim is:—

1. A tilling tool having in combination a frame, and spirally formed non-rotary members, said members being fixedly secured at each end to said frame, and being adapted to enter the soil and having a substantially horizontal disposition, so that the axis of each of said members is parallel to the soil.

2. A tilling tool having in combination, a frame, and a plurality of open or extended non-rotary coils, said coils being fixedly secured at each end to said frame and being adapted to enter the soil, and having a substantially horizontal disposition, so that the axis of each coil is parallel to the soil.

3. A tilling tool having in combination a socketed frame, and a plurality of open or extended non-rotary coils, said coils being fixedly secured at each end to said frame and being adapted to enter the soil, and having a substantially horizontal disposition, so that the axis of each coil is parallel to the soil.

In testimony whereof, I have signed my name to this specification.

GEORGE SYKES.